United States Patent [19]

Takahashi

[11] Patent Number: 4,796,146
[45] Date of Patent: Jan. 3, 1989

[54] PROTECTION CIRCUIT FOR A THYRISTOR CONVERTER

[75] Inventor: Tadashi Takahashi, Kawasaki, Japan

[73] Assignee: Kabushiki Kaisha Toshiba, Kanagawa, Japan

[21] Appl. No.: 188,154

[22] Filed: Apr. 28, 1988

Related U.S. Application Data

[63] Continuation of Ser. No. 938,979, Dec. 8, 1986, abandoned.

[30] Foreign Application Priority Data

Dec. 10, 1985 [JP] Japan .................. 60-277488

[51] Int. Cl.$^4$ .................. H02H 7/10; H02H 3/20
[52] U.S. Cl. .................. 361/91; 361/18; 361/111; 363/54; 363/57
[58] Field of Search .................. 361/18, 56, 86, 88, 361/89, 91, 100, 111; 363/54, 57, 58, 68, 70

[56] References Cited

U.S. PATENT DOCUMENTS

| | | | |
|---|---|---|---|
| 3,842,337 | 10/1974 | Ekstrom et al. | 363/53 |
| 3,878,448 | 4/1975 | Jackson et al. | 363/68 |
| 3,962,624 | 6/1976 | Ostlund et al. | 363/68 |
| 4,065,802 | 12/1977 | Mizukawa et al. | 361/18 |
| 4,084,207 | 4/1978 | Piccone et al. | 361/91 |
| 4,377,835 | 3/1983 | Asplund et al. | 361/91 |
| 4,414,599 | 11/1983 | Kobayashi | 361/91 X |
| 4,536,816 | 8/1985 | Matsumura et al. | 361/91 |

FOREIGN PATENT DOCUMENTS 50-38508 12/1975 Japan.
1549405 8/1979 United Kingdom.

Primary Examiner—M. H. Paschall
Assistant Examiner—A. Jonathan Wysocki
Attorney, Agent, or Firm—Foley & Lardner, Schwartz, Jeffery, Schwaab, Mack, Blumenthal & Evans

[57] ABSTRACT

A protection circuit is provided which digitally detects the presence/absence of individual forward voltages across all thyristors at a level low enough compared to the allowable voltage, judges a partial turn-off in accordance with the number of detection signals indicative of the presence/absence, and determines simultaneous firing protection of all the thyristors in accordance with the result of the judgement.

4 Claims, 4 Drawing Sheets

PROTECTION CIRCUIT FOR A THYRISTOR CONVERTER

This application is a continuation of application Ser. No. 938,979, filed Dec. 8, 1986 now abandoned.

BACKGROUND OF THE INVENTION

1. Field of the Invention

The present invention relates to a protection circuit for a thyristor converter housing a unit arm composed of a plurality of thyristors connected in series with each other.

2. Description of the Prior Art

High-voltage thyristor converters are employed in various applications such as direct-current power transmission systems and reactive power compensation devices. They achieve their ratings by a series or series-parallel connection of many thyristors. Thus one technical problem with a thyristor converter of this type is how to cause its respective thyristors to share voltage and current stresses equally at the time of turn-on or turn-off of the thyristors. To this end, various measures are employed. Among these important technical problems there is the problem of an over voltage due to a partial turn-off at the time of turn-off (voltage sharing among some of the series connected thyristors which are turned off). In more detail, when many thyristors are turned off, reverse voltages are required to be applied across the corresponding thyristors during long enough intervals that all of the thyristors can withstand forward voltages subsequently applied thereto. In case these reverse voltage intervals are insufficient, when a forward voltage is applied across the thyristors, some thyristors can withstand the forward voltage, but the remaining thyristors fail to perform forward recovery, i.e., recover their features to withstand the forward voltage, with the result that they maintain their conductive states. This phenomenon is a so-called partial turn-off phenomenon. When the turn-off phenomenon occurs, the arm total voltage is applied across some thyristors which have performed their forward recovery. Thus when the voltage applied across the respective thyristors is approximately equal to or higher than the rated voltage for the respective thyristors, the thyristors will be broken over and fired without any gating signal, and thus the thyristors themselves or the converter will be broken. The prior art protection is that when the reverse voltage interval (margin angle) $\Delta t$ after conducting is smaller than a predetermined value (set time $t_s$), firing instructions are given forcedly to all the thyristors (forced firing) to cause them to be fired simultaneously in order to avoid an application of over voltages across some thyristors. Whether or not the reverse voltage interval (margin angle) $\Delta t$ is sufficient as compared to the predetermined value is determined in relation to the turn-off time $t_f$ of thyristor. On the other hand, since this turn-off time $t_f$ is affected by the junction temperature of the thyristor, the current reduction rate of the thyristor before the reverse voltage interval, the forward voltage increase rate of the thyristor, the value of the forward voltage across the thyristor, etc., the worst conditions, i.e., maximum value is employed as the turn-off time $t_f$.

A protection gating instruction signal is prepared on condition that the reverse voltage interval $\Delta t$ is shorter than its set time $t_s$ to deliver it to all of the thyristors, thus to forcedly fire them. In this case, since the converter operates as an inverter, when viewed from the entire system, it can be said that the converter is forcedly brought into a commutation failure by forced firing. Thus the system is adversely affected. Namely, the protection of thyristors by forced firing is not necessarily preferable for the system.

The set time $t_s$ is usually determined in relation to the turn-off time $t_f$ (approximately 400 $\mu$s) under the worst conditions of the thyristor. Namely, it is determined to be approximately 600 to 800 $\mu$s (an electrical angle of 10.8 to 14.4 degrees in the case of 50 Hz) on the basis of the maximum value of the turn-off time $t_f$ in consideration of the phase difference due to voltage unbalance and the set margin etc. In this respect, when the direct current and its reduction rate are not so large, i.e., when the commutation conditions are not so severe, the turn-off time $t_f$ can be 200 to 300 $\mu$s.

The above prior art has the following drawbacks:

(1) Since the reverse voltage set time $t_s$ is set under the worst operating conditions, the thyristor is subjected to forced firing even when forced firing protection is not required, for example, when the junction temperature is low or current reduction rate of the thyristor is small, thus allowing the converter to be fail in commutation, resulting in the application of a disturbance to the system.

(2) Since the reverse voltage set time $t_s$ is usually large; namely, 600 to 800 $\mu$s (an electrical angle of 10.8 to 14.4 degrees in the case of 50 Hz), constant control of a control advance angle $\gamma$ in the inverter is usually performed by setting the control advance angle at a value larger than the reverse voltage set time $t_s$, for example, at an electrical angle of 15 to 17 degrees in the case of a 50 Hz signal in order to prevent frequent occurrence of a protection gating signal. Such a large control advance angle would increase the reactive power of the converter, with the result that reactive power larger than is required must be supplied for the system.

(3) Since the number of series connected thyristors is ordinarily determined on the basis of the surge test voltage in consideration of an inrush surge voltage (the surge test voltage = (1.5-2.0) × the crest value of the normal operating voltage) instead of the normal operating voltage, the converter can sufficiently withstand the normal operating voltage when more than 50 to 70% ((1/2.0 − 1/1.5) × 100%) of the thyristors have performed their forward recovery even if a partial turn-off phenomenon occurs. Therefore, when at least more than 50% of the thyristors have performed their forward recovery, the occurrence of a protection gating signal, which would adversely affect the system, i.e., commutation failure should be avoided. In spite of this, since the prior art protection from a partial turn-off due to an insufficient margin angle is, in a sense, an anticipatory protection, protection gating signals are produced more often than they would be needed, giving rise to the serious drawback for the system that commutation failure would be caused unnecessarily many times.

The overvoltage prevention system for the partial turn-off widely used in the prior art have been referred to above. Another system is proposed by the Japanese patent publication No. 1865/77. In this system, forward voltage sense circuits are provided one for each thyristor to sense the individual forward voltages across all of the thyristors in an analog manner. The difference in voltage between two appropriate sets of forward voltage signals output by the sense circuits is extracted.

Then, the voltage difference signal is compared with a reference voltage corresponding to an allowable forward thyristor voltage (withstand voltage). When the former exceeds the latter, it is judged that a partial turn-off phenomenon has occurred. On the basis of this judgement, an operating signal is produced and then is output via a pulse shaping circuit as a protection gating instruction signal.

In accordance with this protection system, when a partial commutation failure occurs, detection of this fact is conducted to effect simultaneous firing for protection. Accordingly, this allows unnecessary simultaneous firing to be reduced to a much greater extent as compared with the first-mentioned system, thus making it possible to lessen adverse influences on the system to some degree. However, this system also has the following drawbacks:

(1) Two compared forward voltage signals are considered in an attempt to select corresponding thyristors having the maximum and minimum storage carriers $Q_{max}$ and $Q_{min}$. These $Q_{max}$ and $Q_{min}$ elements as they are, however, will not necessarily be maximum and minimum, respectively, under all of the operating conditions, giving rise to the possibility the thyristors cannot be protected. Namely, even if a partial turn-off occurs, there could occur such a circumstance that the system is unable to detect this partial turn-off.

(2) Since the difference between the two forward voltage signals (analog signals) corresponding to the forward voltage across the thyristors is compared with a reference voltage corresponding to a voltage near the withstand voltage of a thyristor, there is no time margin from the determination to the simultaneous firing, resulting in the possibility that the thyristors may not be protected. Namely, various partial turn-off states are conceivable. Depending upon the number of elements which cannot perform their forward recovery, the voltages and voltage change rates of the elements which have performed forward recovery vary to great extent. Thus it is supposed that the thyristor voltages have already exceeded their allowable values at the time when a simultaneous-firing pulse is supplied thereto.

(3) Differently from the partial turn-off, the partial turn-on is not necessarily caused by the thyristors having the maximum storage carriers, i.e., short reverse voltage interval. In other words, even among thyristors having the same storage carriers, the thyristors having short turn-off time $t_f$ are likely to cause a partial turn-on.

Even the last mentioned prior art fails to provide secure and safe protection at the time of occurrence of the partial turn-off phenomenon.

SUMMARY OF THE INVENTION

It is an object of the present invention to provide a protection circuit for a thyristor converter which can eliminate the above drawbacks, and which can prevent commutation failure due to unnecessary simultaneous firing as much as possible, and securely protect the thyristors when a partial turn-off phenomenon has occurred.

According to the present invention, this and other objects are accomplished by digitally detecting the presence/absence of respective forward voltages across all of the thyristors at a level low enough compared to the allowable voltage, judging how a partial turn-off is conducted in accordance with the number of detection signals indicative of the presence/absence, and determining simultaneous firing protection on the basis of the judgement.

DETAILED DESCRIPTION OF THE PREFERRED EMBODIMENTS

Embodiment 1

Figure 1:
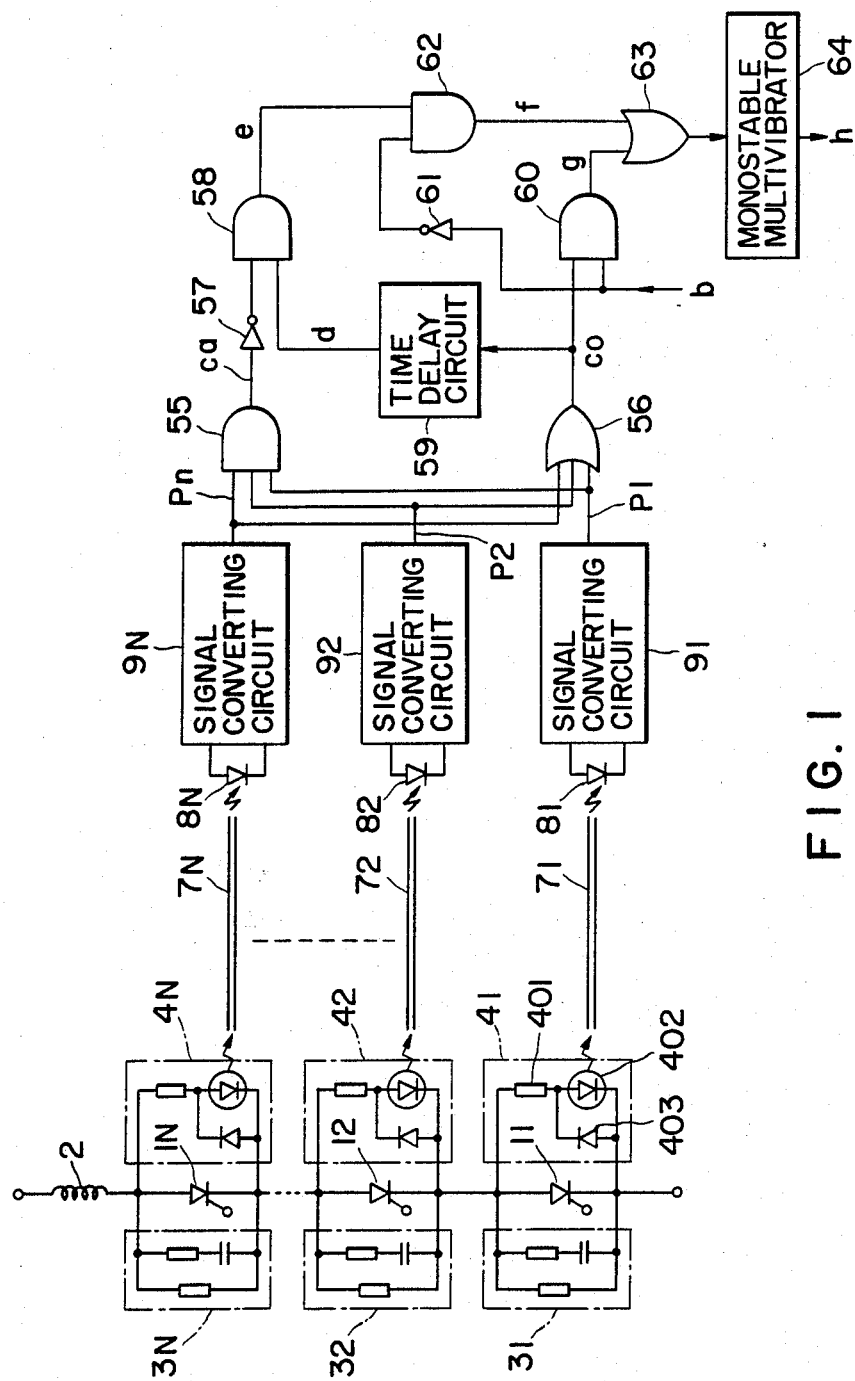
FIG. 1 is a block diagram illustrating a first embodiment of a protection circuit according to the present invention.

FIG. 1 shows one embodiment of the present invention in which a converter arm is composed of thyristors connected in series 11 to 1N. In order to suppress an increase in the rate of a thyristor current or voltage, a reactor 2 is connected in series with the arm. These thyristors 11 to 1N are connected in parallel with voltage dividing circuits 31 to 3N, respectively, in order that they share equally voltages applied across the thyristors. When the converter arm composed of thyristors 11 to 1N is divided into corresponding units, these units are provided with forward voltage sense circuits 41, 42, . . . 4N, respectively, each including a resistor 401 having a high resistance, a light emitting element 402 connected in series with resistor 401, and a diode 403 connected in anti-parallel with light emitting element 402. The sense level of each sense circuit should preferably be as low as possible within a range where no unnecessary operation is effected. For example, this sense level is set to a few percent of the crest value of the operating voltage. The output signals from the forward voltage sense circuits, i.e., light output signals from light emitting elements 402, are delivered via corresponding light guides 71 to 7N to the ground potential sides and are then converted by corresponding light receiving elements 81 to 8N and signal converting circuits 91 to 9N to binary electric signals P1 to Pn. These n forward voltage signals P1 to Pn thus obtained are delivered to an AND gate 55 and an OR gate 56. The output signal ca from the AND gate 55 is input via an inverter 57 to a first input terminal of an AND gate 58. To a second input terminal of the AND gate 58, a signal d obtained by passing the output signal co from OR gate 56 through a delay circuit 59 is input. The output signal co from OR gate 56 is also input to a first input terminal of an AND gate 60. To a second input terminal of the AND gate 60, a conduction instruction signal b is input. This conduction instruction signal b is delivered via an inverter 61 to a first input terminal of an AND gate 62. To a second input terminal of the AND gate 62, an output signal e from the AND gate 58 is delivered. Output signals f and g from the respective AND gate 62 and 60 are fed via an OR gate 63 to a monostable multivibrator 64, which outputs a gate instruction signal h having a pulse width $t_p$ enough to fire the thyristors.

In accordance with the circuit shown in FIG. 1, the AND output ca of all of the thyristor forward voltage signals obtained from the AND gate 55 and the OR output co of all of the thyristor forward voltage signals co obtained from the OR gate 56 are logically compared to judge the presence or absence of a partial turn-off phenomenon. As a result, when it is judged that the partial turn-off phenomenon is present, the above-mentioned protection gating instruction signal f is produced. Namely, according to the circuit configuration of FIG. 1, when no partial turn-off is occurring, the forward voltage OR signal co and the forward voltage AND signal ca are detected substantially simultaneously at the time when a forward voltage is applied across the converter arm ($t=t'_2$). In contrast, when the partial turn-off phenomenon is occurring, the forward voltage OR signal co is detected at the time when the forward voltage is applied across the arm ($t=t'_2$) since the thyristors which have performed their forward recovery share the applied voltage. However, since there are some thyristors which have not performed their forward recovery, no forward voltage AND signal ca is detected. Thus this fact allows a partial turn-off to be detected. This is the principle of the circuit shown in FIG. 1.

Figure 2:
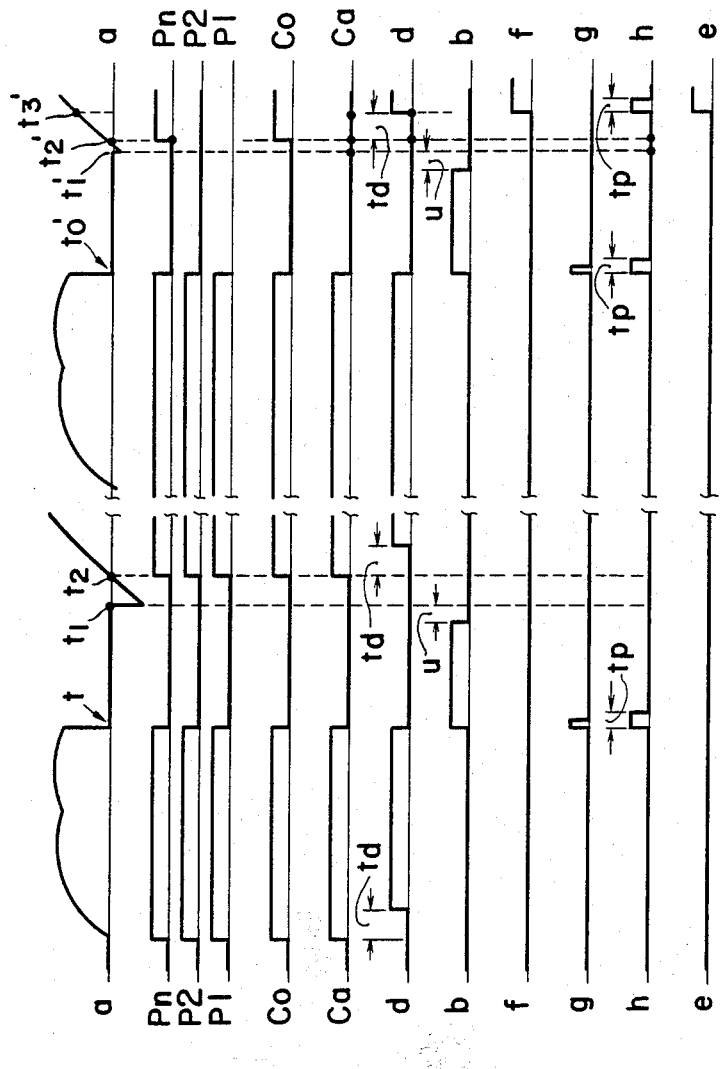
FIG. 2 is a timing chart used for explaining the operation of the protection circuit of FIG. 1.

Now the operation of the circuit of FIG. 1 will be described in more detail with reference to the timing chart of FIG. 2.

FIG. 2a shows the case where the reverse voltage interval (margin angle $\Delta t = t_2 - t_1$) after the current is turned off is sufficiently longer than the turn-off time $t_f$ of the thyristor and thus no partial turn-off occurs. FIG. 2b shows the case where the reverse voltage interval ($\Delta t = t'_2 - t'_1$) is shorter than the turn-off time $t_f$ and thus a partial turn-off occurs. In FIG. 2a, the thyristors are turned off at time $t=t_1$, with the result that the reverse voltage is applied across the thyristors. Since the reverse voltage interval is sufficiently long, i.e., lasts until time $t=t_2$, no partial turn-off occurs. At time $t=t_2$, both forward voltage OR signal co and forward voltage AND signal ca are output. Since a signal d delayed by a time $t_d$ with respect to the forward voltage OR signal co and a signal obtained by inverting the forward voltage AND signal ca are input to the AND gate 58, the output signal e of the gate 58 represents a "0" and the output signal f of the AND gate 62 also represents "0". Namely, since no partial turn-off occurs at this time, no protection gating instruction signal is produced. On the other hand, in the case shown in FIG. 2b, since the reverse voltage interval from time $t'_1$ to $t'_2$ is short, a partial turn-off occurs. As a result, the forward voltage OR signal co shifts to a "1" at time $t=t'_2$ when a forward voltage is applied across the converter arm while the forward voltage AND signal ca remains "0". Thus the AND condition on the output d of delay circuit 59 and an inverted signal the forward voltage AND signal ca holds at time $t=t'_2+t_d$ and thus the output signal e and hence the gating instruction signal f become "1". Namely, at time $t=t'_2+t_d$, the protection gating instruction signal is produced and this signal is delivered simultaneously to all of the thyristors. Thus, the thyristors are rapidly protected against their overvoltage condition during the partial turn-off. In this case, since the forward voltage sense level is sufficiently low, it is possible to judge the presence/absence of a partial turn-off near a zero forward voltage. In addition, since the voltage applied across the thyristors when the thyristors are all fired simultaneously are sufficiently low, the satisfactory protection of the thyristors can be achieved. The delay time $t_d$ of delay circuit 59 is set in order to avoid unnecessary operations due to variations in the operation of the respective forward voltage sense circuits. The dalay time $t_d$ is required to be set to about 10 to 100 $\mu$s although it depends upon the setting of the forward voltage sense circuits.

EMBODIMENT 2

Figure 3:
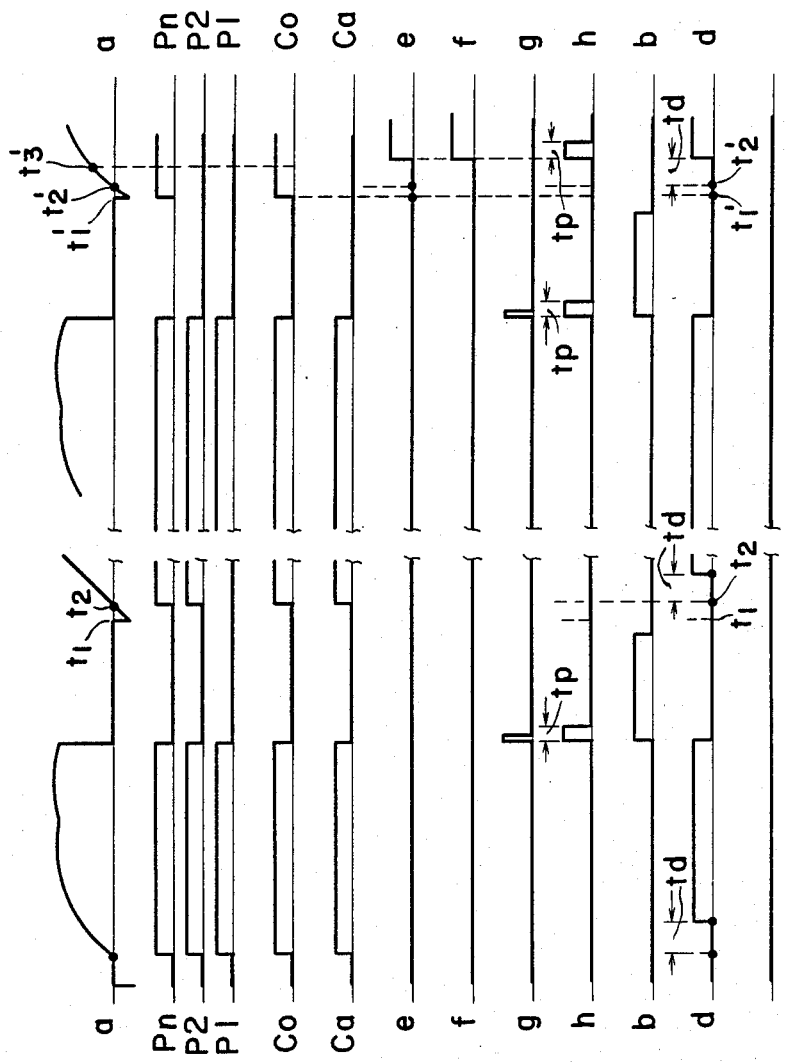
FIG. 3 is a timing chart used for explaining the operation of another embodiment of the protection circuit according to the invention.

Instead of the AND gate 55 of FIG. 1, an x/n logical majority decision circuit 65 may be provided which outputs a "1" signal when x or more of n forward voltage sense signals are "1". In such a modification, even in case all of the n thyristors do not perform their forward recovery, if x or more of the thyristors perform their forward recovery with the (n−x) or less remaining thyristors not performing their forward recovery, the protection gating instruction signal can be locked. Namely, it is assumed that if x or more of the thyristors perform the forward recovery, the thyristors can sufficiently withstand the steady-state converter arm voltage. In such a case, although a partial turn-off phenomenon is occurring, it is unnecessary to fire the converter arm forcedly, resulting in no possibility that commutation failure is caused. In accordance with the above concept, locking of the protection gating instruction signal is implemented. In this case, x is determined as enough of recovering thyristors to cause them to cooperate to sufficiently withstand the converter arm voltage, and thus usually 50% or more of the total number n. For example, when x is selected to be 50% of n, the frequency of occurrence of protection gating instruction signals can be greatly decreased when compared to the first embodiment (corresponding to x=n=100%). Assuming that n=3, x=2, if two of three forward voltage sense signals represent "1" at time $t=t_2$ in the case of FIG. 3a (corresponding to the case of FIG. 2a), no protection gating instruction signal is produced. However, in the case of FIG. 3b (corresponding to the case of FIG. 2b), since only one of all three forward voltage sense signals becomes "1" at time $t'_2=t'$ a protection gating instruction signal is produced at time $t=t'_2+t_d$.

OTHER EMBODIMENT

Figure 4:
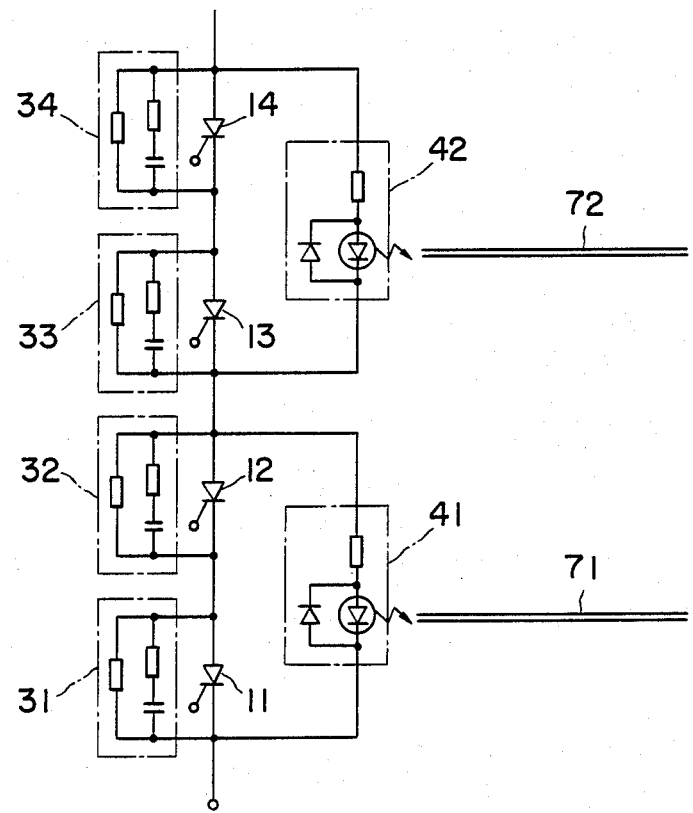
FIG. 4 is a connection diagram of thyristor units in still another embodiment of the protection circuit accoding to the present invention.

While a forward voltage sense circuit is shown as being provided for each thyristor in the embodiments 1 and 2, the present invention is not limited such an implementation. In addition, there may be employed an arrangement such that each unit includes, for example, 2 to 10 of thyristors connected in series and a forward voltage sense circuit is provided per each unit. FIG. 4 illustrates forward voltage sense circuits 41, 42, . . . provided for units of paired thyristors 11, 12; 13, 14; . . . respectively. Also, in this embodiment, a logic circuit similar to that of the first and second embodiments may be incorporated to obtain an operative effect similar to those thereof. In this respect, in the case of FIG. 1, it can be regarded that one unit is constituted with a single thyristor.

While in the above embodiment, only a forward voltage after a reverse voltage during normal commutation in the converter has been described, it cannot be said that a partial turn-off occurs necessarily in the normal commutation alone. Such a partial turn-off can occur, for example, when the bypass-pair operation is switched to the normal operation or when the conducting thyristors are turned off immediately after the gates are blocked. As is clear from the description made thus far, the present invention is also applicable during these partial turn-off other than during commutation. While in the above embodiments a forward voltage OR signal is used as a time base signal, other equivalent signals may be used instead. For example, either a zero voltage point signal occurring when the reverse voltage transfers to the forward voltage or a signal occurring when the reverse voltage is lost may be used. In this case, however, it is necessary to accurately correct the reference signal and the time required for actual detection of a forward voltage.

In the above three embodiments, each of the thyristors shown may be replaced with a plurality of parallelly connected thyristors.

According to the present invention, a partial turn-off phenomenon itself is detected and a protection gating instruction signal is produced based thereon. Accordingly, thyristors can securely be protected only when they are truly in danger when compared with a conventional, in a sense, anticipatory protection depending upon the length of the reverse voltage interval. Namely, when no partial turn-off is occurring or when there is no danger although a partial turn-off is occurring, there is no need for generation of a protection gating instruction signal. The present invention is capable of suppressing the occurrence of such a unnecessary signal and the frequent generation of unnecessary commutation failure. Thus conventional constant control of a margin angle $\gamma$ having a value larger than a set reverse voltage (margin angle) value determined on the basis of a turn-off time of the thyristor when the commutation conditions are severe, for example, when the direct current is large or the current reduction rate is high, can be reduced to the just limit of occurrence of a partial turn-off depending upon the commutation conditions according to the present invention. Thus reactive power for the converter can be reduced. In addition, according to the present invention, it is assured that a partial turn-off of detected and simultaneous firing voltage is sufficiently low, so that perfect protection of the thyristors is accomplished.

What is claimed is:

1. A protection circuit for a thyristor converter having a unit arm comprising a plurality of units connected in series, each unit including at least one thyristor, said protection circuit comprising:

a plurality of forward voltage sense circuit means correspondingly provided in said plurality of units, each of said forward voltage sense circuit means sensing whether their corresponding unit is not in an ON state even though a forward voltage is applied;

first means for detecting the time when said forward voltage is applied across said unit arm on the basis of output signals from said forward voltage sense circuit means and producing a detection output;

second means for producing an operating signal when more than a predetermined number of said forward voltage sense circuit means have sensed their corresponding units are not in an ON state even though a forward voltage is applied; and third means for simultaneously delivering a protection gate firing instruction to all of said thyristors of said unit arm on the basis of both outputs from said first and second means being applied to said third means, and delay means provided between said first and third means for delaying the application of the detection output from said first means to said third means by a time required for compensating for variations in the operating characteristics of said forward voltage sense circuit means.

2. A protection circuit as set forth in claim 1, wherein said first means includes an OR gate.

3. A protection circuit as set forth in claim 1, wherein said second means includes a logic circuit for outputting said operating signal when all of said forward voltage sense circuit means sense that their corresponding units are not in an ON state even though a forward voltage is applied.

4. A protection circuit as set forth in claim 1, wherein said second means includes a majority decision circuit for outputting said operating signal when at least one half of said forward voltage sense circuit means sense that their corresponding units are not in an ON state even though a forward voltage is applied.

* * * * *